United States Patent [19]
Lohbeck

[11] Patent Number: 5,984,568
[45] Date of Patent: Nov. 16, 1999

[54] CONNECTOR ASSEMBLY FOR AN EXPANDABLE SLOTTED PIPE

[75] Inventor: Wilhelmus Christianus Maria Lohbeck, Rijswijk, Netherlands

[73] Assignee: Shell Oil Company, Houston, Tex.

[21] Appl. No.: 08/952,836

[22] PCT Filed: May 23, 1996

[86] PCT No.: PCT/EP96/02271

§ 371 Date: Mar. 9, 1998

§ 102(e) Date: Mar. 9, 1998

[87] PCT Pub. No.: WO96/37680

PCT Pub. Date: Nov. 28, 1996

[30] Foreign Application Priority Data

May 24, 1995 [GB] United Kingdom .................... 9510465

[51] Int. Cl.[6] ..................................................... F16B 2/04
[52] U.S. Cl. .......................... 403/375; 403/297; 403/335; 166/207
[58] Field of Search ...................................... 403/309, 300, 403/306, 297, 310–313, 326, 335, 336, 375, 329, 364, 359, 277, 279, 281, 337, 338, 331; 285/258, 397, 322, 370; 166/206, 207, 242.7, 242.1

[56] References Cited

U.S. PATENT DOCUMENTS

| | | | |
|---|---|---|---|
| 889,786 | 6/1908 | Keiner ................................. | 403/364 X |
| 1,301,285 | 4/1919 | Leonard .............................. | 166/206 X |
| 2,226,804 | 12/1940 | Carroll ................................ | 166/206 X |
| 2,475,057 | 7/1949 | Shaber ................................ | 403/336 X |
| 3,253,842 | 5/1966 | Rabe .................................... | 403/364 X |
| 3,373,397 | 3/1968 | Renshaw, Jr. ....................... | 403/326 X |
| 3,413,021 | 11/1968 | Potts ................................... | 285/322 X |
| 4,285,533 | 8/1981 | Silberman et al. ............. | 166/242.1 X |
| 4,907,663 | 3/1990 | Maier .................................. | 403/329 X |
| 5,366,012 | 11/1994 | Lohbeck ............................. | 166/207 X |
| 5,518,072 | 5/1996 | McTernaghan ................. | 166/242.7 X |
| 5,590,714 | 1/1997 | Van Steenwyk et al. ....... | 166/242.1 X |
| 5,667,011 | 9/1997 | Gill et al. ............................ | 166/207 X |
| 5,785,120 | 7/1998 | Smalley et al. .................... | 166/207 X |
| 5,803,179 | 9/1998 | Echols et al. ..................... | 166/242.1 X |

*Primary Examiner*—Harry C. Kim

[57] ABSTRACT

A connector assembly for interconnecting sections of an expandable slotted tubing string is provided. The assembly includes a male part and a female part; each formed integrally with the ends of a respective tubing section. Each part is slotted and adapted to co-axially engage the other part to permit expansion of the coupled parts in a corresponding manner to the tubing sting. The male and female parts are interconnected by one series of circumferentially spaced mechanical fasteners.

4 Claims, 3 Drawing Sheets

CONNECTOR ASSEMBLY FOR AN EXPANDABLE SLOTTED PIPE

This invention relates to a connector assembly for use in connecting sections of an expandable tubing string, and in particular but not exclusively for use in the connection of sections of an expandable slotted tubing (EST) string as utilised in downhole applications in the oil and gas exploration and extraction industries.

Expandable slotted tubing (EST) is used in various downhole applications. The tubing comprises lengths of tube which have been machined to create a large number of longitudinal slots. Thus, it is relatively easy to expand the tube radially outwardly by, for example, running a mandrel through the tubing. The expansion causes the slots to extend to create diamond-shaped apertures. The tubing is useful where it is desired to, for example, line a bore below a restriction without further reducing the diameter of the bore. Using conventional tubing, the outer diameter of the tubing must, by necessity, be of smaller diameter than the restriction, to permit the tubing to be passed through the restriction. This reduction in the bore diameter has a number of significant effects, primarily in reducing the production capabilities of the bore. Using EST, the tubing may pass through a restriction into a reamed section of bore below the restriction. The tubing may then be expanded to a diameter larger than the restriction.

EST is supplied in lengths which are, at present, made up into a string by welding the lengths to one another. This is relatively time consuming and expensive and in many situations, for example in an off-shore operation in bad weather, it may be difficult to maintain consistent weld quality. Safety problems may also arise due to the high temperatures and exposed flames or sparks created by a welding operation. Further, in the event of a "mis-run", requiring the welded lengths of tubing forming the EST string to be separated, the tubing must be cut, and the cut tubing cannot be reused.

It is among the objects of the present invention to provide a means of connecting sections of EST which obviates or mitigates these difficulties.

According to the present invention there is provided a connector assembly for interconnecting sections of an expandable slotted tubing string, the assembly comprising a male part and a female part formed integrally with the ends of respective tubing sections, each part being slotted and being adapted to co-axially engage the other part to permit expansion of the coupled parts in a corresponding manner to the tubing string, wherein the male and female part are interconnectable by one series of circumferentially spaced mechanical fasteners.

Preferably, the male part is formed by an end of one of the interconnected tubing sections of which the outer surface has been machined away over a selected distance and the female part is formed by an end of the other of the interconnected tubing sections of which the inner surface has been machined away over a similar distance.

In such case it is preferred that the free end of the male and female part fits within an annular groove formed at the other end of the corresponding part such that if the parts co-axially engage each other said free ends are locked in a radial sense inside said grooves to prevent flaring of said free ends when the tubing string is expanded.

This minimizes the possibility of the free ends flaring on expansion of the tube. Such flaring of the male end would create an irregularity in the tubing bore on which tools could become snagged.

The slotted free ends of the parts will define fingers and in a preferred arrangement mechanical fasteners are provided for coupling the respective overlapping fingers to one another. This prevents the ends of the parts from separating when the connected tubing is expanded. Preferably, each fastener is located substantially in the middle of a node and halfway between a pair of adjacent slots. The fasteners may be releasable, for example short screws for location in appropriate holes provided in the parts, such that the tubing may be separated in the event of a mis-run. The use of screws and the like, and the associated screw-holes, also provides a convenient means for ensuring that the parts are properly aligned.

It is therefore preferred that the mechanical fasteners consist of short screws that pass through radial holes drilled through the walls of the male and female parts and the head of each screw is sunken within a recess formed in the outer surface of the female part and the shank of each screw engages a screw thread formed in the radial hole passing through the male part.

Furthermore, the female part may be formed by the free end of an expandable slotted tubing section which is slightly expanded before arranging the female part co-axially around the male part.

These and other aspects of the present invention will now be described, by way of example, with reference to the accompanying drawings, in which.

Figure 1:
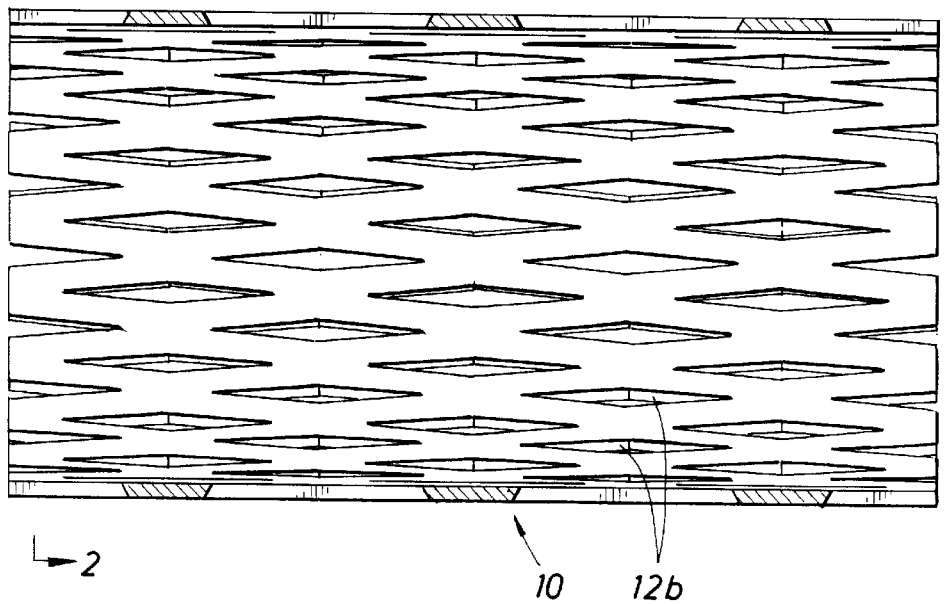
FIG. 1 is a sectional view of a length of expandable slotted tubing (EST), shown in an expanded configuration.
Figure 2:
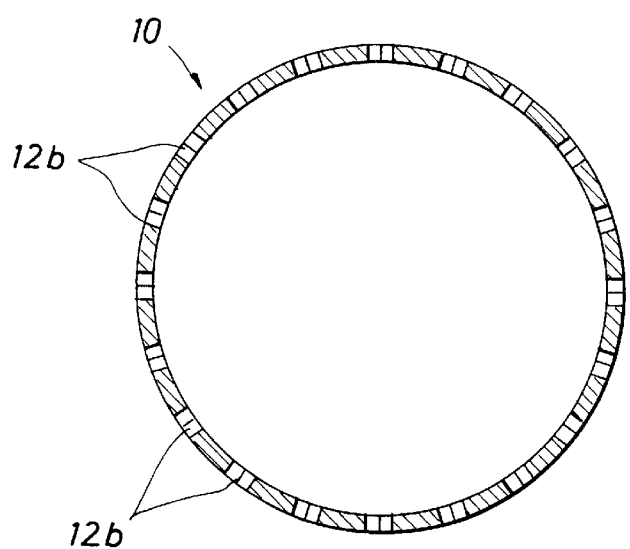
FIG. 2 is a sectional view on line 2—2 of FIG. 1, and in addition showing the EST in unexpanded configuration.
Figure 2A:
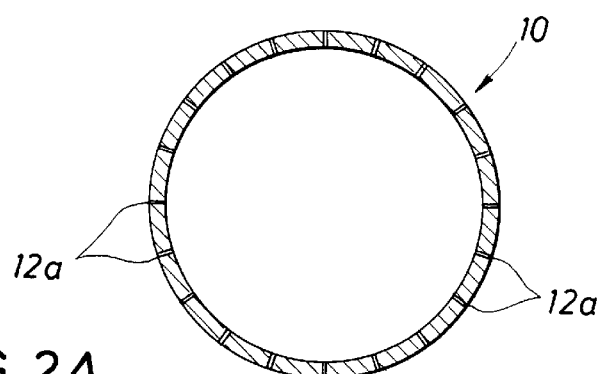

Reference is first made to FIGS. 1 and 2 of the drawings, which illustrate a length of expandable slotted tubing (EST) 10. In its initial configuration, the tubing 10 is simply a length of pipe in which a series of longitudinal slots 12 have been machined (shown as 12a in FIG. 2). Applying a radially outward force to the tubing wall, for example by passing a cone or mandrel through the tubing, causes the tube to expand such that the slots 12a become diamond shaped openings 12b.

Figure 3:
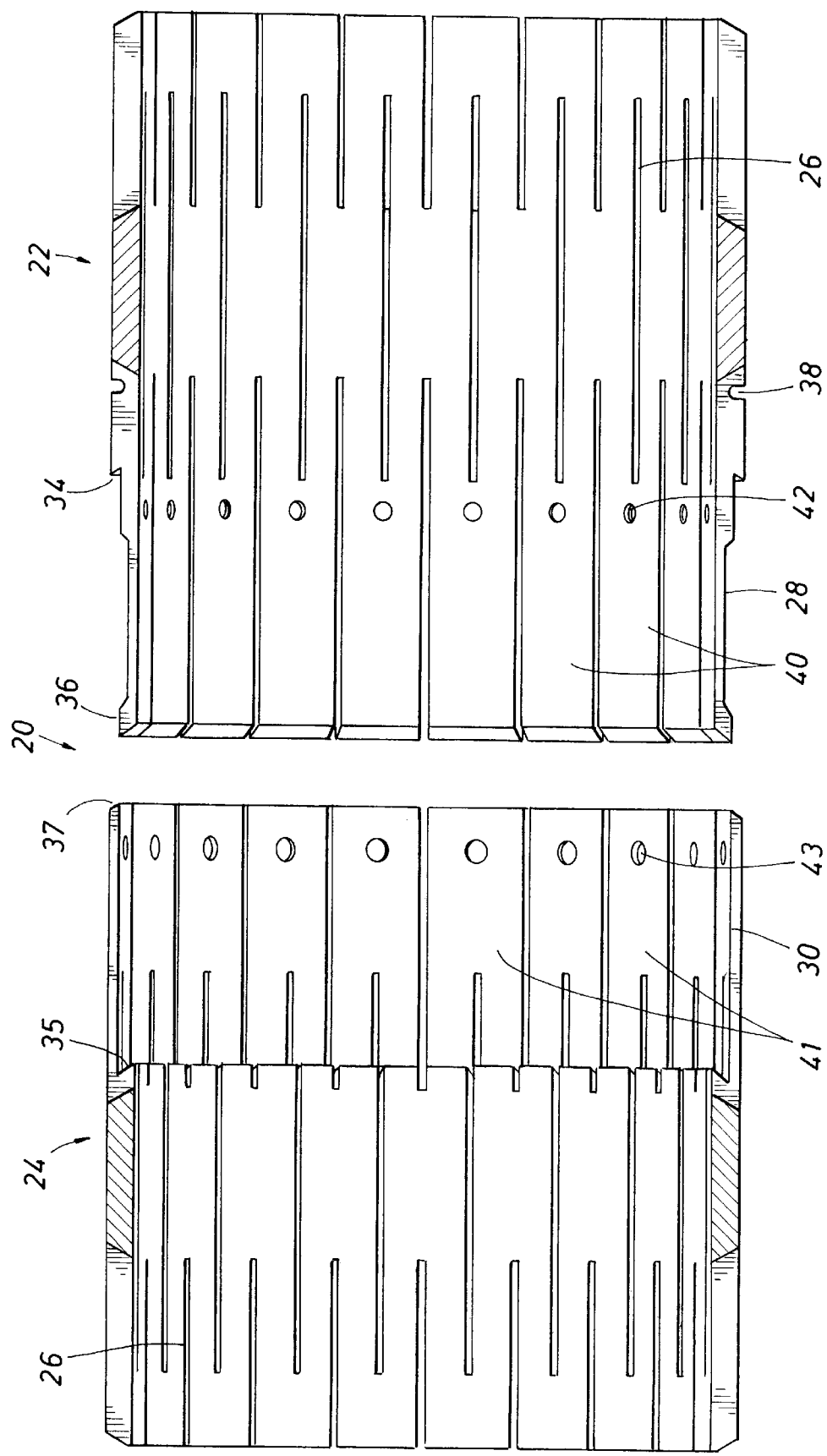
FIG. 3 is a half section of a connector assembly in accordance with a preferred embodiment of the present invention, with the parts of the assembly shown separated.
Figure 4:
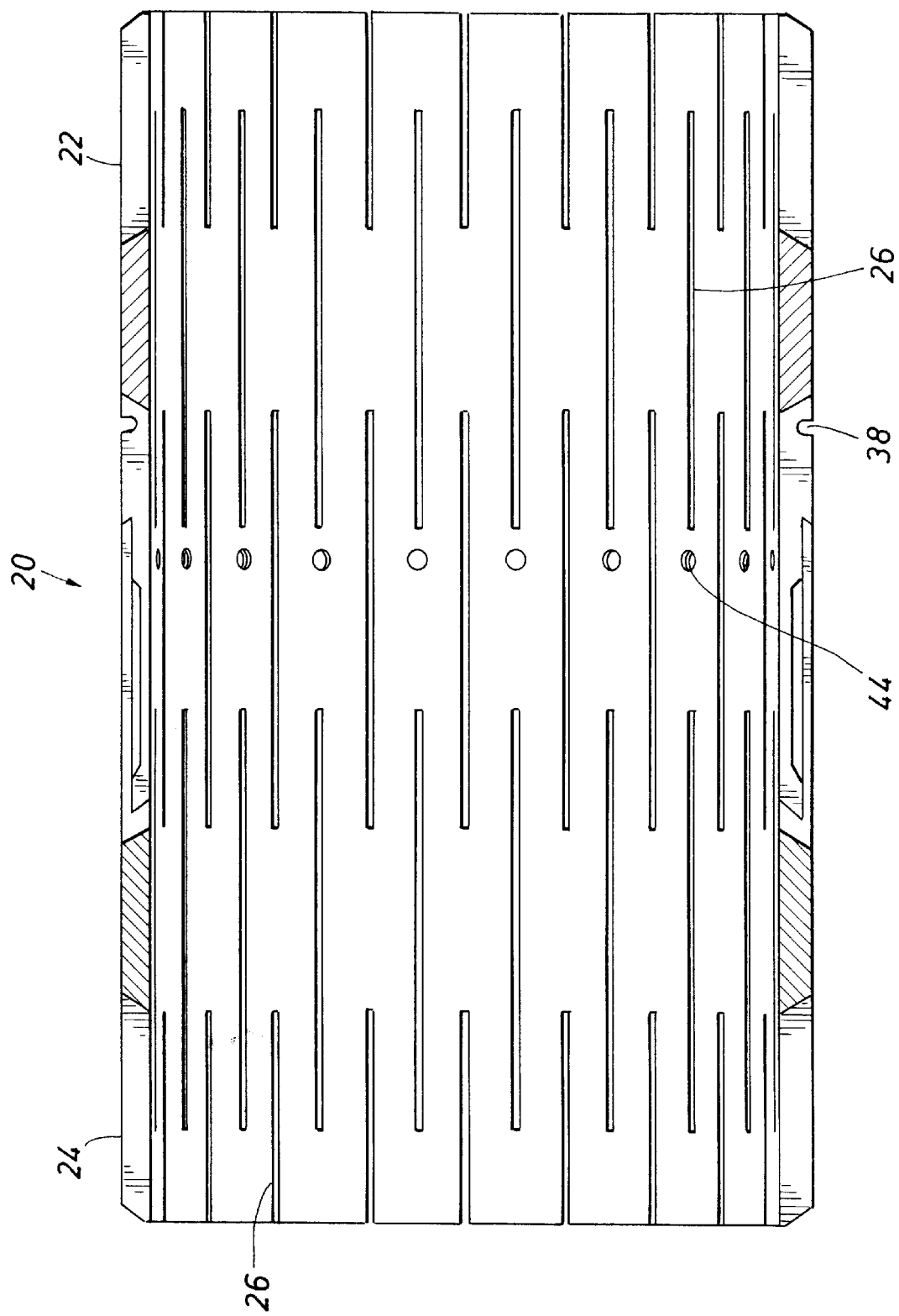
FIG. 4 a half section of the connector assembly of FIG. 3, showing the parts connected.

The tubing 10 is supplied in lengths suitable for transportation and handling and these are joined to one another to create a tubular string. The connector assembly 20 as illustrated in FIGS. 3 and 4 of the drawings is used to connect such tubing lengths. The assembly 20 comprises a male part 22 and a female part 24. The parts 22, 24 are intended to expand in a similar manner to the tubing 10, and as such are provided with similar longitudinal slots 26.

The free end of the male part 22 is machined to form a male portion 28 having a reduced outer diameter and the free end of the female part 22 defines a corresponding female portion 30 having a reduced and enlarged inner diameter to receive the male portion 28, as will be described. Each part 22, 24 defines a respective annular groove in the form of an undercut ledge 34, 35 for engaging the free end 36, 37 of the other part which is of corresponding form. This serves to prevent the free ends of one part separating from the other part on expansion of the tubing.

The slots 26 in the parts 22, 24 are arranged such that the free ends 36, 37 of the parts each define fingers 40, 41, and each of these fingers defines a hole 42, 43. The holes 43 in the female part are counter-sunk, whereas the holes 42 in the male part 22 are threaded such that the fingers 40, 41 may be secured to one another using a number of short screws 44.

To connect two lengths of tubing provided with the tubing connector assembly 20, the parts 22, 24 are brought together such that the free end 36 of the male part passes inside the free end 37 of the female part. The screws 44 are then secured in the holes 42, 43.

The desired number of tubing sections is connected in this manner to form a string and run downhole to the desired location within the bore. The tubing and the connector assemblies may then be expanded to the desired diameter. However, in the event of a mis-run, requiring the tubing to be withdrawn and disassembled, this may be achieved relatively easy by removing the screws 44.

It will be clear to those of skill in the art that the above-described embodiment is merely exemplary of the present invention, and may be subject to various modifications and improvements without departing from the scope of the invention.

I claim:

1. A connector assembly for interconnecting sections of an expandable slotted tubing string, the assembly comprising a male part and a female part formed integrally with the ends of respective tubing sections, each part being slotted and being adapted to co-axially engage the other part to permit expansion after the parts are engaged in a corresponding manner to the tubing string, wherein the male and female parts are interconnectable by one series of circumferentially spaced mechanical fasteners, wherein the male part is formed by an end of one of the interconnected tubing sections of which the outer surface has been machined away over a selected distance and the female part is formed by an end of the other of the interconnected tubing sections of which the inner surface has been machined away over a similar distance.

2. The connector assembly of claim 1, wherein the male part fits within an annular groove formed in the female part and the female part fits within an annular groove formed in the male part such that if the parts co-axially engage each other said male and female parts are locked in a radial sense inside said grooves to prevent flaring of said male and female parts when the tubing string is expanded.

3. The connector assembly of claim 1 wherein the mechanical fasteners consist of short screws, each screw comprising a shank and a head, and each screw passing through radial holes drilled through the male and female parts and the head of each screw is sunken within a recess formed in the outer surface of the female part and the shank of each screw engages a screw thread formed in the radial hole passing through the male part.

4. The connector assembly of claim 1, wherein at least some of the slots of the male and female parts of the connector assembly are substantially aligned.

\* \* \* \* \*